Patented May 11, 1926.

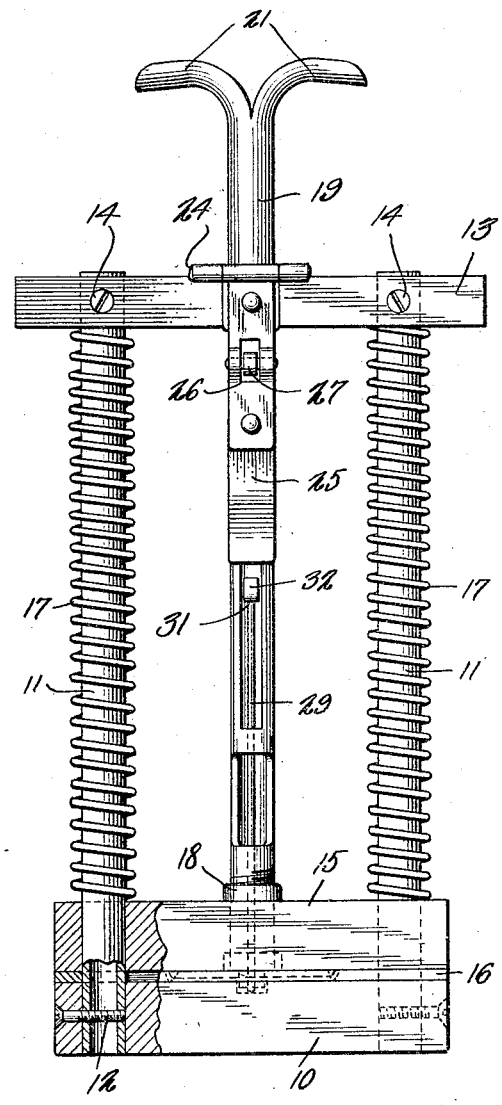
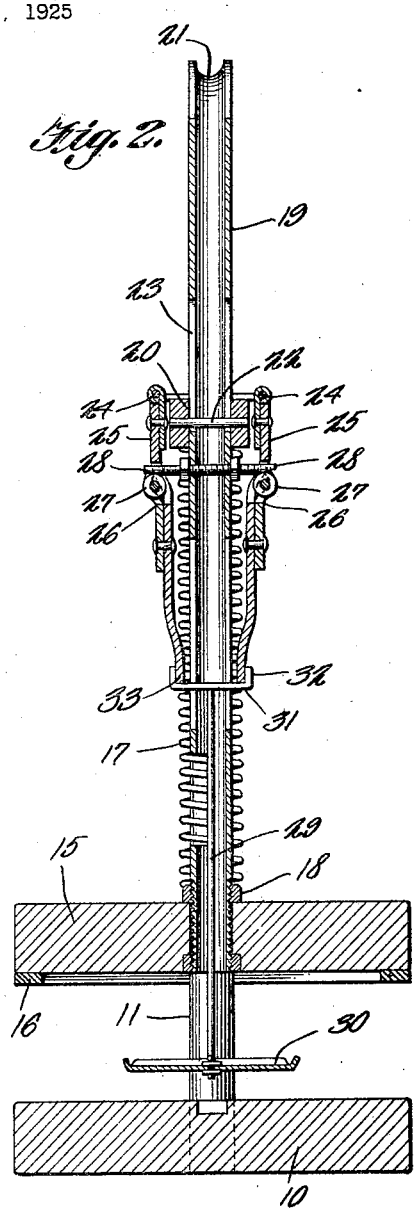

1,584,677

UNITED STATES PATENT OFFICE.

WALLIS STACY, OF STACY, VIRGINIA.

TRAP.

Application filed October 28, 1925. Serial No. 65,425.

This invention relates to improvements in animal traps, an object being to provide a trap which is especially designed for catching rats, mice, chipmunks and other small animals.

Another object of the invention is to provide a trap which is simple in construction, reliable in use and may be "set" without danger of injury to the operator.

With the above and other objects in view, the invention further includes the following novel features and details of construction, to be hereinafter more fully described, illustrated in the accompanying drawings and pointed out in the appended claims.

In the drawings:—

Figure 1 is an elevation partly broken away showing a trap constructed in accordance with the invention.

Figure 2 is a central longitudinal sectional view of the same.

Referring to the drawings in detail wherein like characters of reference denote corresponding parts, the reference character 10 indicates the base of the trap to which is secured spaced parallel guide rods 11, the latter being preferably of tubular construction and secured within the base by screws or similar fastening devices 12. Spaced from the base and secured to the opposite ends of the rods 11 is a cross bar 13, screws 14 or other fastening devices being provided to secure the rods 11 to the bar.

Mounted for sliding movement upon the guide rods 11 is a plunger 15 which is adapted to engage the base 10, the said plunger and base being preferably formed of wood and rectangular in shape. The plunger carries a yieldable buffer strip 16 which engages the base 10 and which provides a shallow depression in the under face of the plunger. Springs 17 surround the rods 11 between the plunger and the cross bar 13 and act to force the plunger into contact with the base.

Secured within the plunger as shown at 18 is a plunger rod 19. This rod passes through a guide opening 20 provided in the bar 13 and has its outer end shaped to provide finger grips 21, by means of which the plunger may be drawn along the guide rods 11 against the action of the springs 17. A guide pin 22 has its opposite ends secured in the bar 13 and passes through slots 23 provided in the plunger rod and acts to prevent rotation of the rod.

Hingedly secured to opposite edges of the bar 13 as shown at 24 are triggers 25. These triggers are provided with openings 26 in which are mounted rollers 27. Secured to the rod 19 is a trigger pin 28 whose opposite ends extend radially for engagement with the rollers 27 when the triggers 25 are in set position, as illustrated in Figure 2 of the drawings. In this position, the plunger is spaced from the base 10 and is held in spaced position through the engagement of the trigger pin with the rollers.

The plunger rod 19 is preferably of hollow construction and extending longitudinally through this rod is a rod 29 which carries at one end a bait pan or holder 30. Extending from the inner end of the rod are oppositely disposed fingers 31 having right angled extremities 32 which engage lugs 33 extending from the ends of the triggers 25. The fingers 31 thus provide latches to engage the triggers and hold the latter in set position.

The bait is placed upon the bait holder 30 and when the animal attempts to obtain the bait he will either press the bait holder downward to release the triggers 25, or will partially rotate the holder and consequently move the fingers out of contact with the lugs 33 of the triggers. In either event, the triggers will be released and the springs 17 will force the plunger 15 downward as the ends of the trigger pin will ride off the rollers 27. To facilitate this, the opposite ends of the trigger pin are preferably beveled as indicated at 33.

The invention is susceptible of various changes in its form, proportions and minor details of construction and the right is herein reserved to make such changes as properly fall within the scope of the appended claims.

Having described the invention what is claimed is:—

1. An animal trap comprising a base, a cross member spaced above the base, guide rods connecting the base and cross member, a plunger movable along the guide rods, springs to force the plunger to engage the base, a rod rigid with the plunger and guided through the cross member, a trigger carried by the cross member, means carried by the plunger rod to engage the trigger and hold the plunger against the action of the spring, a bait holder between the base and plunger and means carried by the bait holder to engage the trigger and hold the latter against operation.

2. An animal trap comprising a base, a cross member spaced above the base, guide rods connecting the base and cross member, a plunger movable along the guide rods, spring to force the plunger to engage the base, a rod rigid with the plunger and guided through the cross member, a trigger carried by the cross member, means carried by the plunger rod to engage the trigger and hold the plunger against the action of the spring, a bait holder between the base and plunger and means extending through and movable independently of the plunger rod to engage the trigger and hold the latter against operation.

3. An animal trap comprising a base, a cross member spaced above the base, guide rods connecting the base and cross member, a plunger movable along the guide rods, springs to force the plunger to engage the base, a rod rigid with the plunger and guided through the cross member, oppositely located pivotally mounted triggers carried by the cross member upon opposite sides of the plunger rod, means carried by the plunger rod to engage the triggers and hold the plunger against the action of the springs, a bait holder between the base and plunger and means carried by the bait holder and engaging the trigger to hold the latter against operation.

4. An animal trap comprising a base, a cross member spaced above the base, guide rods connecting the base and cross member, a plunger movable along the guide rods, springs to force the plunger to engage the base, a rod rigid with the plunger and guided through the cross member, oppositely located pivotally mounted triggers carried by the cross member upon opposite sides of the plunger rod, means carried by the plunger rod to engage the triggers and hold the plunger against the action of the springs, a bait holder between the base and plunger, a rod extending from the bait holder longitudinally into the plunger and radial fingers extending from the rod of the bait holder and engaging the triggers to hold the latter against operation.

In testimony whereof I affix my signature.

WALLIS STACY.